(12) United States Patent
Gupta et al.

(10) Patent No.: US 10,484,251 B1
(45) Date of Patent: Nov. 19, 2019

(54) PROTOCOL AGNOSTIC MESSAGE ORIENTED MIDDLEWARE FOR IOT, SAAS AND ENTERPRISE INTEGRATION

(71) Applicant: SRB TECHNOLOGIES, INC., McLean, VA (US)

(72) Inventors: Bramh Gupta, Ashburn, VA (US); Eamin Zhang, Milpitas, CA (US); Frederick Yatzeck, Fairfax, VA (US)

(73) Assignee: SRB Technologies, Inc., McLean, VA (US)

( * ) Notice: Subject to any disclaimer, the term of this patent is extended or adjusted under 35 U.S.C. 154(b) by 371 days.

(21) Appl. No.: 15/359,388

(22) Filed: Nov. 22, 2016

Related U.S. Application Data

(60) Provisional application No. 62/259,070, filed on Nov. 24, 2015.

(51) Int. Cl.
| | | |
|---|---|---|
| *G06F 15/16* | (2006.01) | |
| *H04L 12/24* | (2006.01) | |
| *H04L 29/06* | (2006.01) | |
| *H04L 29/08* | (2006.01) | |

(52) U.S. Cl.
CPC .......... *H04L 41/20* (2013.01); *H04L 67/2809* (2013.01); *H04L 69/08* (2013.01); *H04L 69/18* (2013.01)

(58) Field of Classification Search
CPC ....... H04W 84/12; H04W 4/80; H04W 88/06; H04W 72/0466; H04W 84/18; H04W 8/005; H04W 12/06; H04W 24/04; H04L 5/0007; H04L 67/1097; H04L 63/0428; H04L 67/141; H04L 9/0861; H04L 51/02
See application file for complete search history.

(56) References Cited

U.S. PATENT DOCUMENTS

| | | | | |
|---|---|---|---|---|
| 6,021,261 A | * | 2/2000 | Barrett, Jr. .......... | G06F 11/2236 714/37 |
| 6,625,169 B1 | * | 9/2003 | Tofano .................... | H04L 69/08 370/466 |
| 7,290,267 B2 | | 10/2007 | Brown et al. | |
| 7,567,956 B2 | | 7/2009 | Yu et al. | |
| 7,970,918 B2 | | 6/2011 | Thompson et al. | |
| 2003/0037174 A1 | * | 2/2003 | Lavin ...................... | G06F 9/541 719/313 |
| 2004/0117802 A1 | * | 6/2004 | Green ................. | G06F 11/3006 719/318 |

(Continued)

*Primary Examiner* — Michael A Keller
*Assistant Examiner* — Thao D Duong
(74) *Attorney, Agent, or Firm* — Kanika Radhakrishnan; Evergreen Valley Law Group

(57) ABSTRACT

A method for providing a protocol agnostic message oriented middleware for IoT, SaaS and enterprise application integration. The method includes connecting a first application and device to a protocol-less integration middleware broker. Further, the method includes converting data of an industry standard integration protocol from the first application and device to a common protocol used within the protocol-less integration middleware broker. Furthermore, the method includes converting the data from the common protocol to a desired protocol pertaining to a second application and device. Moreover, the method includes exchanging data to the second application and device wherein the data is transformed from one protocol to another.

18 Claims, 12 Drawing Sheets

(56) References Cited

U.S. PATENT DOCUMENTS

2006/0133307 A1* 6/2006 Fukasawa ........... H04L 41/0816
　　　　　　　　　　　　　　　　　　　　　　370/328
2006/0159077 A1　　7/2006 Vanecek
2010/0161821 A1* 6/2010 Slamkovic ................ G06F 9/54
　　　　　　　　　　　　　　　　　　　　　　709/230

* cited by examiner

PROTOCOL AGNOSTIC MESSAGE ORIENTED MIDDLEWARE FOR IOT, SAAS AND ENTERPRISE INTEGRATION

TECHNICAL FIELD

Embodiments of the disclosure relate generally to middleware and integration using diverse and distributed protocols. Embodiments relate more particularly to a method and system for providing protocol agnostic message oriented middleware for Iota, Seas and Enterprise Application Integration.

BACKGROUND

"Middleware" is software that connects software components or enterprise applications and provides data and services to the applications. Examples of systems connected by Middleware include, web servers, application servers, business operations, ERP (Enterprise Resource Planning) and content management systems.

The concept of "protocol-less" or protocol agnostic middleware came from years of experience of running middleware platform for large scale telecommunication integrations. In the past, it was mandatory for an application to code specific to the middleware protocol and API's for integration with a particular system or a group of integrating systems. Alternatively, bridges or custom adapters were built to make integration work for each specific individual system or application. This increased the effort and or cost of the integration and often was one of the major reasons for delay to integrate. Further, this problem would grow as the enterprises move away from centralized ERP (Enterprise Resource Planning) systems and adopt distributed SaaS (Software as a Service) model. Forcing the SaaS applications to code to one specific protocol would be cost prohibitive and challenging to manage. Moreover, the SaaS applications are run by smaller companies that may not be able to afford coding to proprietary protocols for each of the middleware systems. However, each of the SaaS applications could be expected to provide at least one or other means of integration using industry standard integration protocols.

The existing technology is capable of connecting any application, system or device to any other application, device or system. However, the existing technology requires integrating devices or systems to use the product specific APIs or integration mechanism. Consequently, the integrator needs to write connecting code in the product proprietary APIs and methods for each application or device being integrated by the existing middleware technology. This problem in the existing technology is further aggravated by the adoption of SaaS application and proliferation of IoT (Internet of Things) devices. SaaS applications are smaller but specialized solutions that are replacing monolithic ERP systems. With the diversity created by smaller SaaS applications, there is a need for integration middleware platform that supports diverse integration mechanisms or protocols right out of the box. The existing technology is prohibitively expensive and may not be fit for this kind of application landscape. The IoT space is also fast evolving, creating the challenges similar to SaaS but of much larger volume and scale.

Another problem with the existing technology is the cost of running sophisticated middleware systems. The existing technology requires specialized system administrators to monitor and manage the platform for it to run at optimal levels and ensure that the connected applications and devices are able to exchange information effectively. In addition, the cost of deployment is also high for the existing technology because of the use of older methods and technology procedures. Any time an integration service is deployed, a large number of costly software developer hours are spent in planning and deploying the integration service.

Another problem with the existing technology is the monolithic Hub and Spoke architecture of the available middleware platforms. Traditionally, the middleware is centralized. All the information or the messages flow to the central hub, are processed there and then received by the intended recipient systems. This architecture has the disadvantage that it cannot scale to the increased demand and the workload and often breaks down at the center. This architecture also cannot provide full end to end last mile guaranteed delivery and buffering and cache capability at the edge where the integrating applications start sending or receiving the data. There is a need for a distributed and federated middleware architecture that can provide last mile guaranteed delivery, cache and buffering of data at the edge in case of the intermittent connectivity, and allow for edge and the fog computing acting more like a mesh of integration fabric than a hub and spoke monolith.

In the light of the above discussion, there appears to be a need for automating the operations and the deployment process that is being followed by existing technology.

OBJECT OF INVENTION

The principal object of the embodiments herein is to provide a protocol-less middleware broker that does not have a proprietary API or integration protocol. Specifically, the middleware can accommodate all standard integration protocols and does not enforce a specific or proprietary protocol for integration.

Another object of the embodiments herein is to support all industry standard integration protocols thereby providing hooks to the middleware using any of the preferred integration protocol of connecting devices, applications and systems.

Yet another object of the embodiments herein is to transform data from one protocol to another. Thereby achieving easy integration of diverse devices and systems to connect together with least effort and cost.

Yet another objective of the embodiments herein is to provide a distributed and federated middleware platform that is implemented as a mesh of messaging brokers running on cloud, on premise, on servers and on gateways and routers, providing a messaging fabric that can integrate across clouds and networks providing last mile guaranteed delivery, and cache and buffering capabilities.

Yet another object of the embodiments herein is to target IoT segment where it supports all device integration protocols so that devices can collaborate and send information to the enterprise systems, SaaS applications and databases.

SUMMARY

The above-mentioned needs are met by computer-implemented method, computer program product and system for providing protocol agnostic message oriented middleware for IoT, SaaS and Enterprise Application Integration.

A computer-implemented method for providing a protocol agnostic message oriented middleware for IoT, SaaS and enterprise application integration. The computer-implemented method includes connecting a first application and device to a protocol-less integration middleware broker. Further, the computer-implemented method includes converting data of an industry standard integration protocol from the first application and device to a common protocol used within the protocol-less integration middleware broker. Furthermore, the computer-implemented method includes converting the data from the common protocol to a desired protocol pertaining to a second application and device. Moreover, the computer-implemented method includes exchanging data to the second application and device wherein the data is transformed from one protocol to another.

A computer program product for providing a protocol agnostic message oriented middleware for IoT, SaaS and enterprise application integration. The computer program product includes connecting a first application and device to a protocol-less integration middleware broker. Further, the computer program product includes converting data of an industry standard integration protocol from the first application and device to a common protocol used within the protocol-less integration middleware broker. Furthermore, the computer program product includes converting the data from the common protocol to a desired protocol pertaining to a second application and device. Moreover, the computer program product includes exchanging data to the second application and device wherein the data is transformed from one protocol to another.

A system for providing a protocol agnostic message oriented middleware for IoT, SaaS and enterprise integration includes a suite of adapters and connectors that enable the ability to support all and any standard integration protocol thereby allowing any system to send and receive data using integration protocol of its own choice. Wherein the adapters are responsible for protocol conversion using the industry standard protocols. The connectors are responsible for application specific protocol conversion. The core message broker is used for routing, indirection and transformation which are traditionally the core quality of service requirements of a Message Oriented Middleware (MOM).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

The above-mentioned needs are met by providing a protocol agnostic message oriented middleware for IoT, SaaS and Enterprise Application Integration. The following detailed description is intended to provide example implementations to one of ordinary skill in the art, and is not intended to limit the invention to the explicit disclosure, as one or ordinary skill in the art will understand that variations can be substituted that are within the scope of the invention as described.

Schematic Representation of Environment

Figure 1:
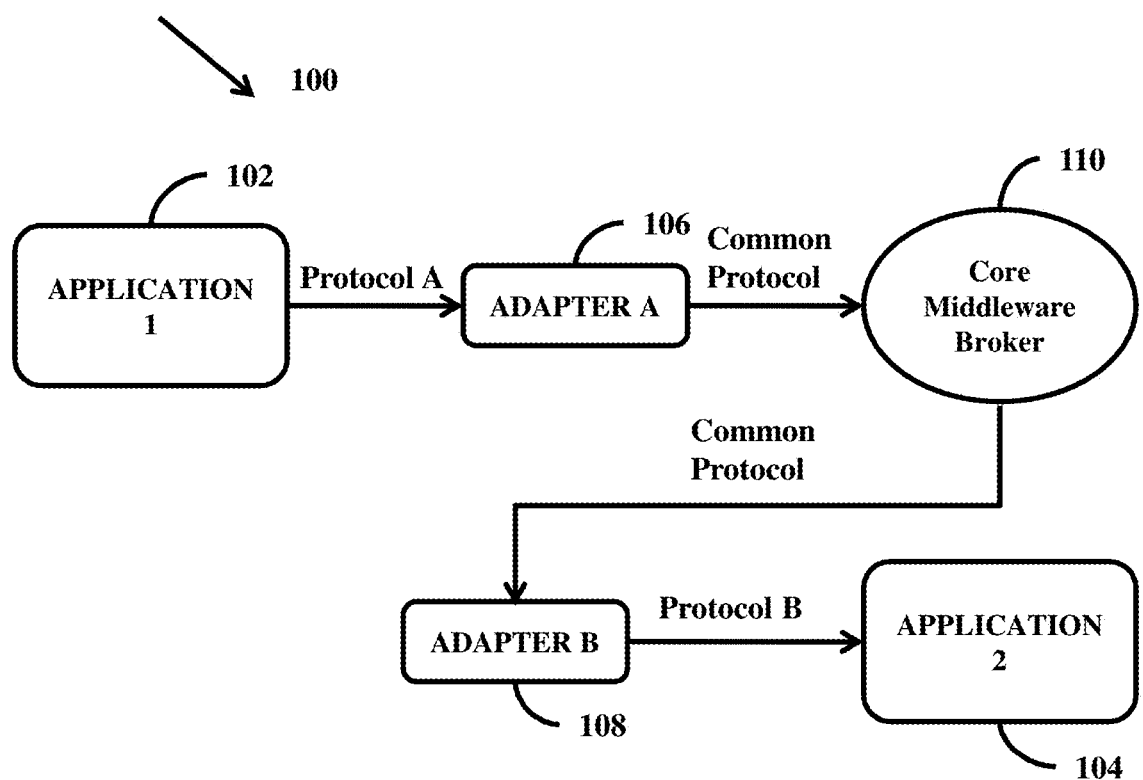
FIG. 1 is a schematic representation of an environment of a suite of adapters and connectors, according to the embodiments as disclosed herein.

FIG. 1 is schematic representation of an environment of a suite of adapters and connectors, according to the embodiments as disclosed herein. The environment 100 illustrates the suite of adapters and connectors that enable the ability to support all and any standard integration protocol. The suite of adapters and connecters are herein referred to as "ThingsConnect". "ThingsConnect" includes two applications namely, application 1 102 and application 2 104. The application 1 102 connects to an Adapter A 106 and subsequently to a Middleware Broker 110. Similarly, application 2 104 connects to the Middleware Broker 110 through the Adapter B 108. The adapters provide all standard protocols conversion and mediation capabilities so that any system can send and receive data (or messages) using the integration protocol of its own choice.

Typically, the adapters convert any standard integration protocols to a common protocol used within the middleware broker 110. Consequently, a protocol-less or protocol agnostic middleware integration platform is established.

For instance, Application 1 102 sends a message in protocol A to the receiving Application 2 104, which receives the message in protocol B. The adapter A106 receives the payload and converts it to a common protocol. The information would then be processed (transformed or enriched) within the middleware broker 110 using the common protocol. After processing the information, the adapter B108 converts the information to protocol B that is received by the Application 2 104.

The integration application on the other end of the integration uses a different industry protocol and the invention converts the message from the common protocol to the one desired by second application.

A common protocol namely, Advanced Message Queue Protocol (AMQP) is used for cross-conversion. In some embodiments, any other suitable protocol which can be an industry standard protocol or a proprietary protocol may be used for the cross-conversion. Further, ThingsConnect supports several standard protocols including MQTT, AMQP, ModBus, CoAP, STOMP, WebSTOMP, XML, JSON, WebServices, SOAP services, HTTP and REST. It will be appreciated to those skilled in the art that, ThingsConnect allows new protocols to be added as they become standardized.

Additionally, ThingsConnect supports an unlimited number of applications that includes major enterprise software, relational databases, SaaS applications, CRM, and analytics engines. As a result, ThingsConnect provides the capability to connect any device, sensor, SaaS application or enterprise system to any other device, sensor or application.

Process Flow of Suite of Adapters and Connectors

Figure 2:
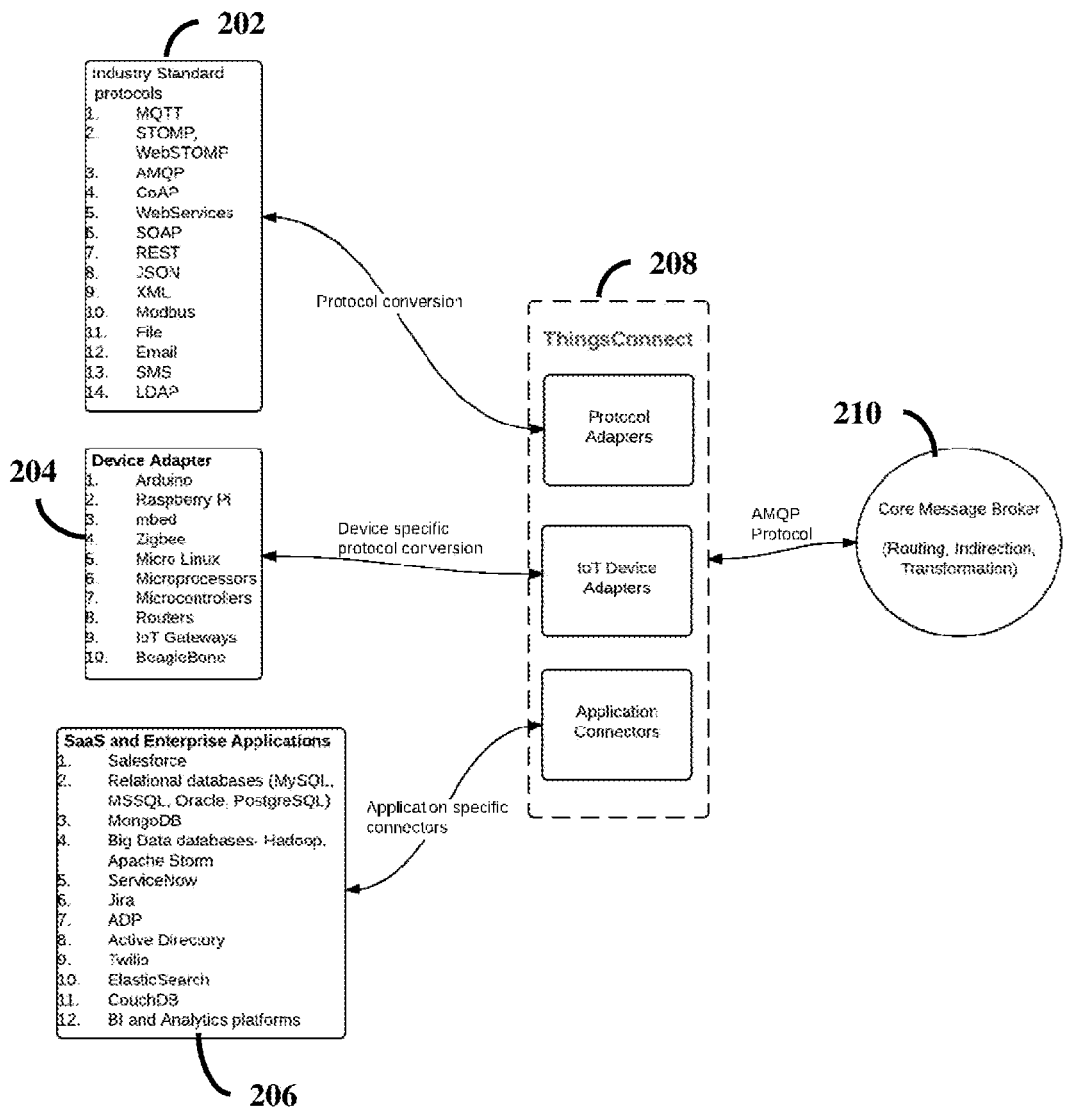
FIG. 2 is a process flow of the suite of adapters and connectors, according to the embodiments as disclosed herein.

FIG. 2 is a process flow of the suite of adapters and connectors, according to the embodiments as disclosed herein.

The process flow includes a list of Industry Standard protocols 202, Device Adapters 204 and SaaS and Enterprise Applications 206 as follows:
1. Industry Standard protocols
   a. MQ Telemetry Transport (MQTT)
   b. Simple/Streaming Text Oriented Messaging Protocol (STOMP)
   c. WebSTOMP
   d. Advanced Message Queuing Protocol (AMPQ)
   e. Constrained Application Protocol (CoAP)
   f. WebServices
   g. Simple Object Access Protocol (SOAP)
   h. REST
   i. JavaScript Object Notation (JSON)
   j. Extensible Markup Language (XML)
   k. Modbus
   l. File
   m. Electronic mail/Email
   n. Short Message Service (SMS)
   o. Lightweight Directory Access Protocol (LDAP)
2. Device Adapter
   a. Arduino
   b. Raspberry Pi
   c. mbed
   d. Zigbee
   e. Micro Linux
   f. Microprocessors
   g. Microcontrollers
   h. Routers
   i. IoT Gateways
   j. BeagleBone
3. SaaS and Enterprise Applications
   a. Salesforce
   b. Relational databases (MySQL, MSSQL, Oracle, PostgreSQL)
   c. MongoDB
   d. Big Data databases—Hadoop, Apache Storm
   e. ServiceNow
   f. Jira
   g. ADP
   h. Active Directory
   i. Twilio
   j. Elastic search
   k. CouchDB
   l. BI and Analytics platforms It will be appreciated to those skilled in the art that the list is constantly evolving and growing as more and more protocols and adapters are added following the schematic and the spirit of the invention.

ThingsConnect 208 includes Protocol Adapters, IoT Device Adapters and Application Connectors. The Protocol Adapters are responsible for protocol conversion using the Industry Standard protocols 202. Similarly, the IoT Device Adapters are responsible for device specific protocol conversion using the Device Adapters 204. Further, the Application Connectors are Application specific connectors for SaaS and Enterprise Applications 206. Typically, ThingsConnect 208 includes a multi-protocol gateway that supports all standard integration protocols. Once a request is received on the multi-protocol gateway, it is processed by "Microservices" connected together using the messaging fabric.

The common protocol, AMPQ Protocol is used for cross-conversion to the core Message Broker 210 which is responsible for routing, indirection and transformation.

Schematic Representation of Flow from Device and Dashboard

Figure 3:
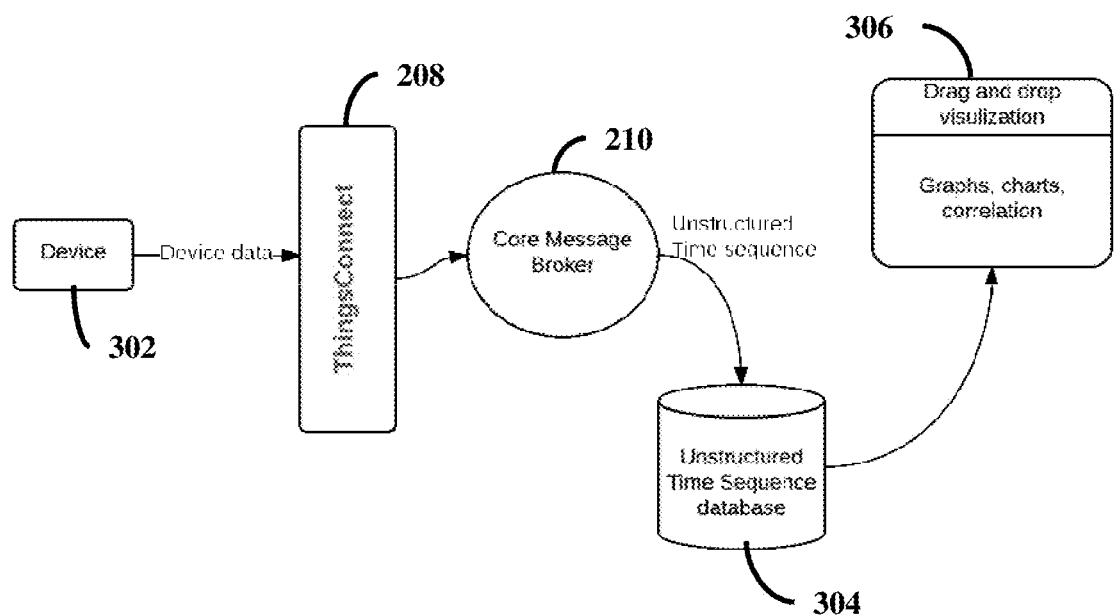
FIG. 3 is a schematic representation illustrating a flow from a IoT Analytics, according to the embodiments as disclosed herein.

FIG. 3 is a schematic representation illustrating a flow from IoT Analytics, according to the embodiments as disclosed herein. One vital feature of the present invention includes "IoT Analytics" 302 real-time engine that provides device data visualization (eliminating the need of programming). Typically, the "IoT Analytics" 302 is a small piece of code or a "plugin" on the device. This device-side plugin sends information to the middleware broker 210. Consequently, the data is available to build user defined graphs, charts, visualizations and dashboards 306.

"IoT Analytics"302 is implemented with the "ThingsConnect" adapter 208 to deliver unstructured device data to the middleware broker 310. The component engine of the middleware broker 310 stores and indexes this unstructured data in a time sequence database. A visualization platform is tied to the indexed time sequence database that provides capability to visualize and correlate device data.

Schematic Representation of Hybrid Messaging Cloud

Figure 4:
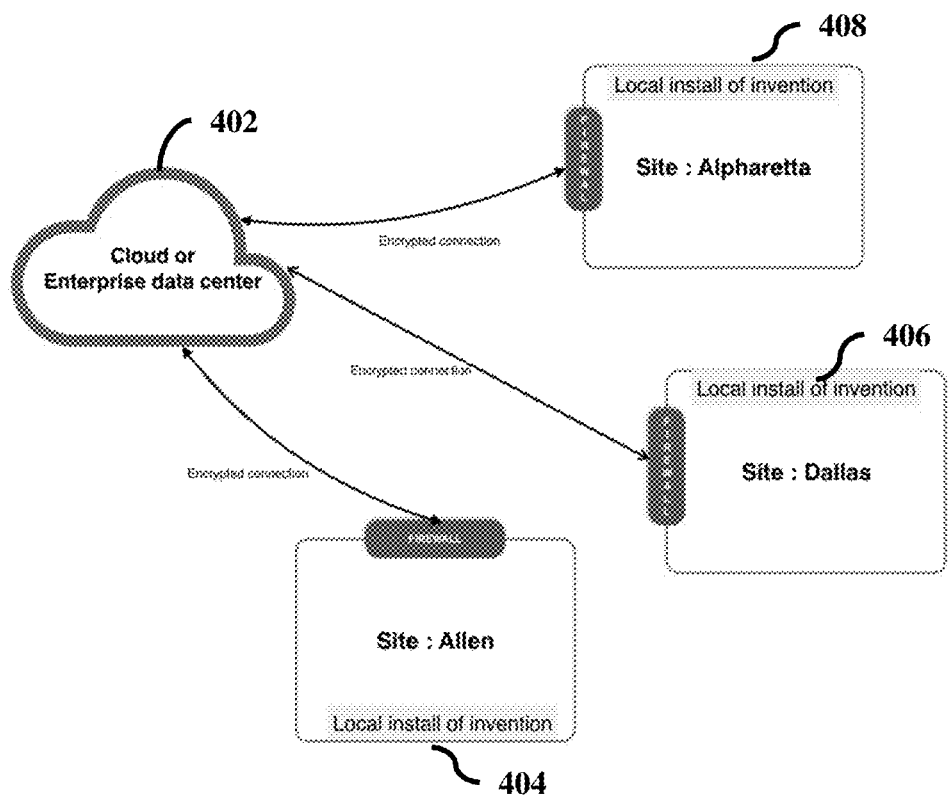
FIG. 4 is a schematic representation of a hybrid messaging cloud, according to the embodiments as disclosed herein.

FIG. 4 is a schematic representation of a hybrid messaging cloud, according to the embodiments as disclosed herein. Yet another feature of the present invention includes Hybrid messaging cloud 402. The hybrid messaging cloud 402 allows the present invention to be available in a federated and decentralized model. Further, the hybrid messaging cloud 402 adds a local site broker, for example Site: Allen 404, Site: Dallas 406 and Site: Alpharetta 408, in federation with the centralized broker. The site broker provides local redundancy and local application integration without hop to the cloud or centralized enterprise broker and a cache mechanism to store messages destined to the centralized enterprise or cloud broker in case of an intermittent connectivity failure.

The Hybrid messaging cloud 402 is available to the site (or local) applications in a federated hybrid fashion. Specifically, this is beneficial to businesses that have enterprise or SaaS application working along with applications which are specific to the local sites or local offices. For instance, large restaurants, resorts, retail store chains and distributed operational facilities (such as oil, gas wells and industrial establishments).

The Hybrid messaging cloud 402 allows on premise and site specific applications to collaborate locally without the hop to the cloud or the centralized enterprise messaging broker. Simultaneously, SaaS and global enterprise applications can collaborate using centralized middleware hosted on the cloud or the enterprise data center thereby, creating a hybrid messaging infrastructure.

Schematic Representation of Message Routing Pattern

Figure 5:
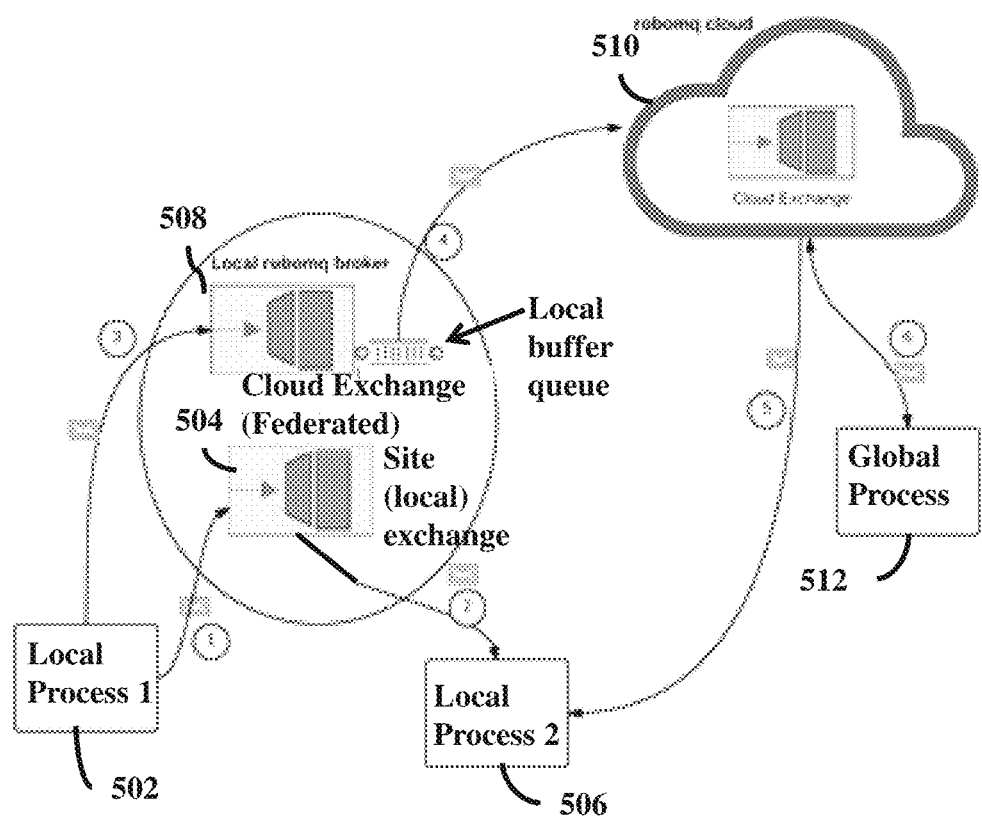
FIG. 5 is a schematic representation of a message routing pattern while using Hybrid Messaging Cloud, according to the embodiments as disclosed herein.

FIG. 5 is a schematic representation of a message routing pattern while using Hybrid Messaging Cloud, according to the embodiments as disclosed herein. In other words, FIG. 5 illustrates how the hybrid cloud federates and delivers messages to local brokers and the centralized cloud or enterprise broker.

A local process 1 502 sends a message for consumption to another local process 2 506 using site specific exchange 504. Alternatively, the local process 1 502 may send a message for a global (corporate) process 512 through a cloud exchange 508. The local process may be defined as a site specific process.

Subsequently, the message is delivered over the federated link. The message could be locally queued (local buffer queue) in case of a connectivity issue. The local process 2 506 receives the message communicating directly to the cloud 510. A global process sends or receives a message communicating with the cloud 510. The global process may be defined as a process that communicates directly to the cloud 510.

Flow Diagram of Data Driven Alerts

Figure 6:
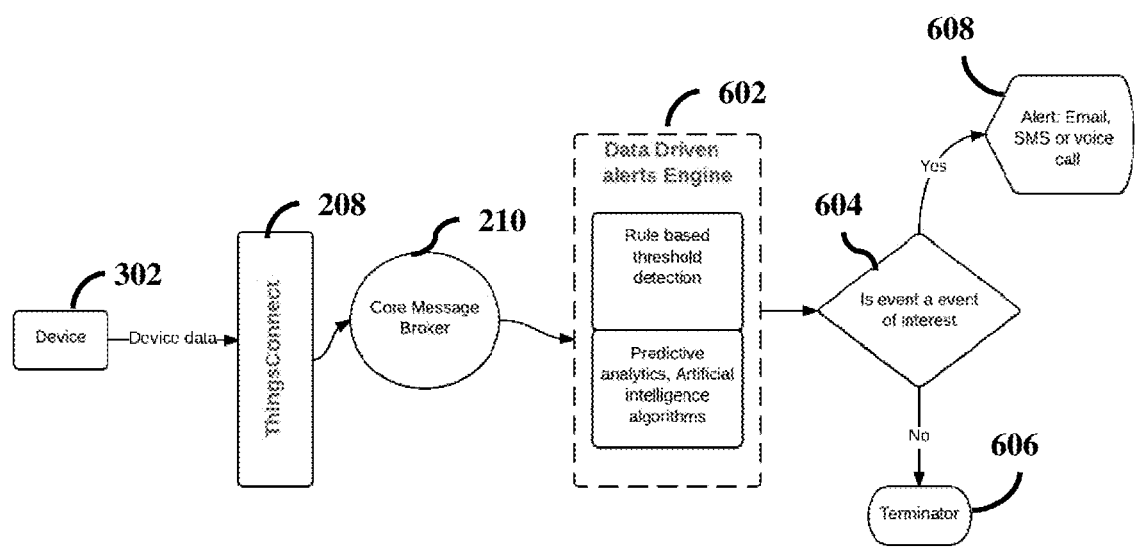
FIG. 6 is a flow diagram of data driven alerts, according to the embodiments as disclosed herein.

FIG. 6 is a flow diagram of Data Driven Alerts, according to the embodiments as disclosed herein. Yet another feature of the present invention is the Data Driven Alerts Engine 602 that provides devices, sensors and applications to send environmental information and observed data to the messaging broker/core Message Broker 210 in a desired protocol. This is achieved by using a small plug-in or agent installed on the device, sensor or application 302. Alternatively, an end device or application can code using industry standard protocols to send data to the middleware broker 210. Subsequently, the data is routed to the Data Driven Alerts Engine 602. The Data Driven Alerts Engine 602 then analyzes 604 the stream of information against the threshold rules setup by the user. An alert 608 is then generated if the data provided by the device or application matches any of the threshold rules. Typically, the alert is delivered to an end user over email, SMS or a voice call. If the data does not match the threshold rules, then the process is terminated 606.

Further, the Data Driven Alerts module includes predictive analytics capabilities. With aid of artificial intelligence algorithms, the Data Driven Alerts module can learn from the data and identify the threshold conditions that could be desired. As a result, the Data Driven Alerts module can predict if the information analyzed in the device or application data stream is a valid alert within allowed error tolerance or confidence level based on the learning from the data previously collected by the system. This ability to build threshold rules by observing the data allows additional robust and wider coverage rules to be created.

Sequence Diagram for Event Driven Analytics

Figure 7:
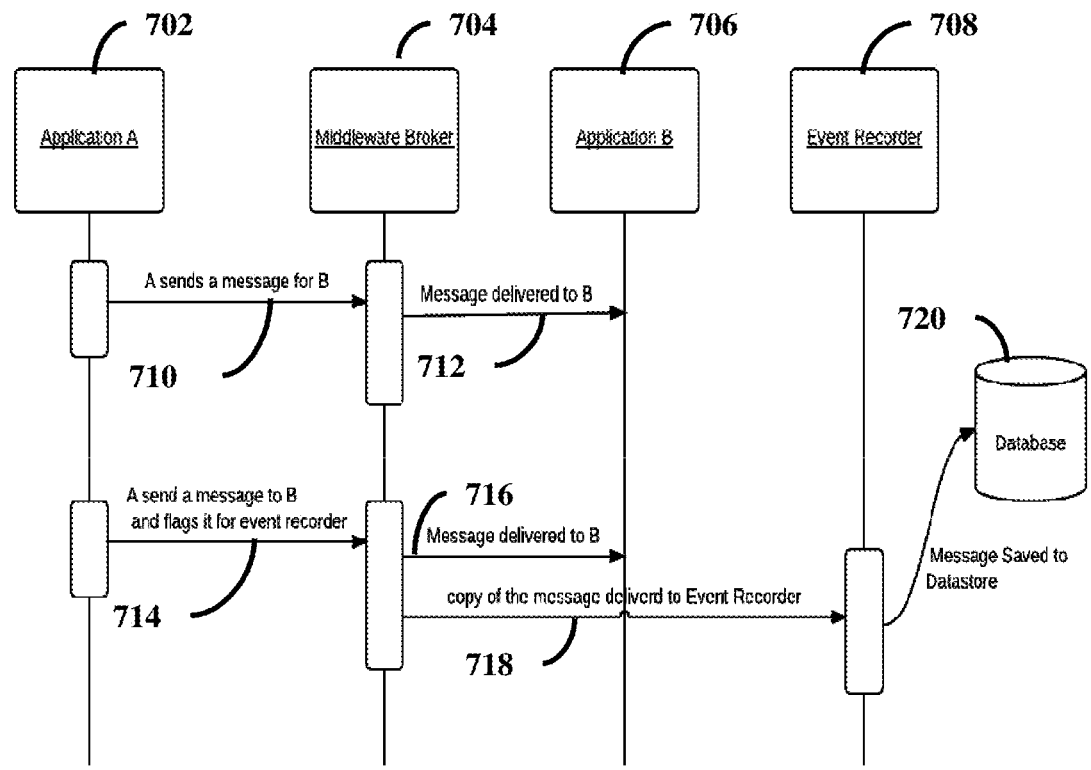
FIG. 7 is a sequence diagram for Event Driven Analytics, according to the embodiments as disclosed herein.
Figure 8:
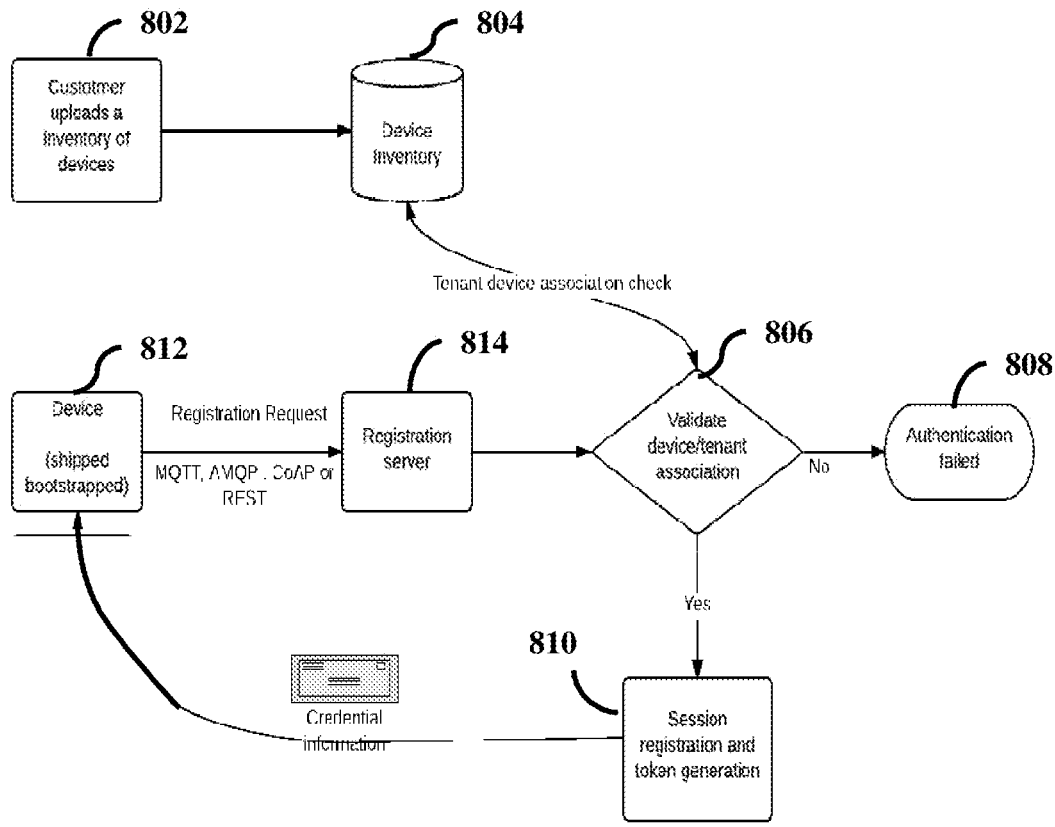
FIG. 8 is a flow diagram illustrating Mission Control, according to the embodiments as disclosed herein.

FIG. 7 is a sequence diagram for Event Driven Analytics, according to the embodiments as disclosed herein.

The present invention is a message oriented middleware that is used for integrating devices, systems and applications to accomplish complex business processes. During the business processes, the message exchanged between two applications (system or devices) needs to be saved in a database or in a message store. The Event Driven Analytics facilitates this message exchange for any integrating applications with no additional effort or coding.

The events or messages to be saved in a database or in an event store can be flagged. The recording of events publicly or privately can also be flagged. Once recorded, the events can be played, retrieved and paused.

Typically, the Event Driven Analytics functionality is implemented along the analogy of a DVR (Digital Video Recorder). Similar to the functions of a DVR, the Event Driven Analytics can be recorded, played and paused.

Specifically, the sequence diagram includes Application A 702, Middleware Broker 704, Application B 706 and Event Driven Analytics 708.

At step 710, Application A 702 sends a message for Application B 706 through the Middleware Broker 704. Subsequently, at step 712, the message is delivered to Application B 706.

At step 714, Application A 702 sends a message to Application B 706 and flags it for an Event Driven Analytics through the Middleware Broker 704. At step 716, the message is delivered to Application B 706. At step 718, a copy of the message is delivered to Event Driven Analytics 708. Subsequently, the message is saved to a database 720.

Flow Diagram of Mission Control

FIG. Bis a flow diagram illustrating Mission Control, according to the embodiments as disclosed herein. The flow diagram begins at step 802.

At step 802, the customer uploads an inventory of devices to device inventory database 804.

At step 806, the device is validated or checked for tenant device association. If the device fails the authentication process, then step 808 is performed. Else step 810 is performed.

At step 810, a session is registered and token is generated. Credential information is passed to the device. The device is bootstrapped with robomq credential that can access registration server only.

At step 812, the device sends a registration request to a registration server. The request may be sent through any suitable protocol, for instance, MQTT, AMQP, CoAP or REST.

Subsequently, step 806 is repeated to form a closed loop.

Sequence Diagram of Mission Control

Figure 9:
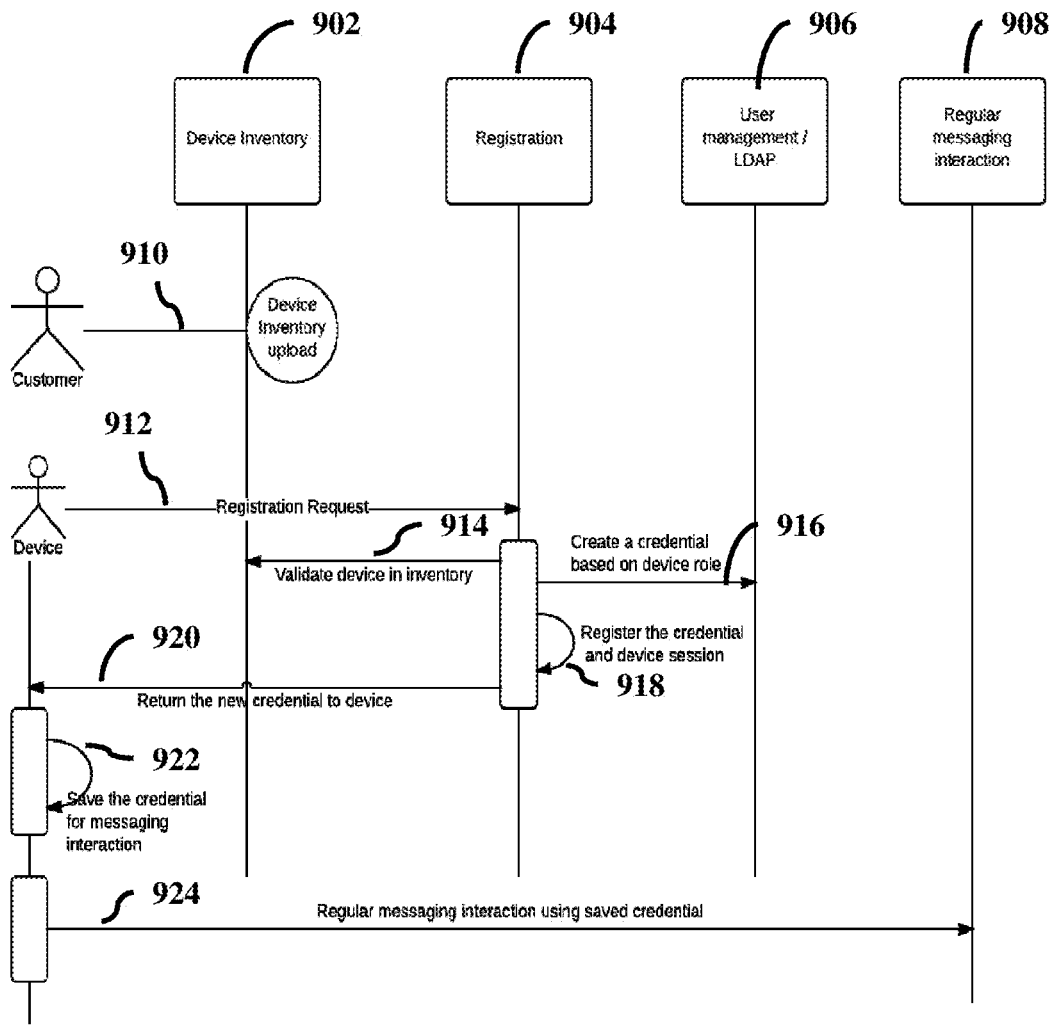
FIG. 9 is a sequence diagram of the Mission Control, according to the embodiments as disclosed herein.

FIG. 9 is a sequence diagram of the Mission Control, according to the embodiments as disclosed herein. The sequence diagram includes a device inventory 902, registration 904, user management/LDAP 906 and regular messaging integration 908.

At step 910, a customer uploads a device inventory.

At step 912, the device sends a registration request to the registration 904.

At step 914, the device is validated in the inventory. If the device is validated, then step 916 is performed.

At step 916, a new credential is created based on the device role with the user management/LDAP 906.

At step 918, the new credential and device session is registered.

At step 920, the new credential is returned to the device.

At step 922, the new credential is saved for messaging interaction.

At step 924, regular messaging interaction is established using saved credential.

Process Flow of Mission Control

Figure 10:
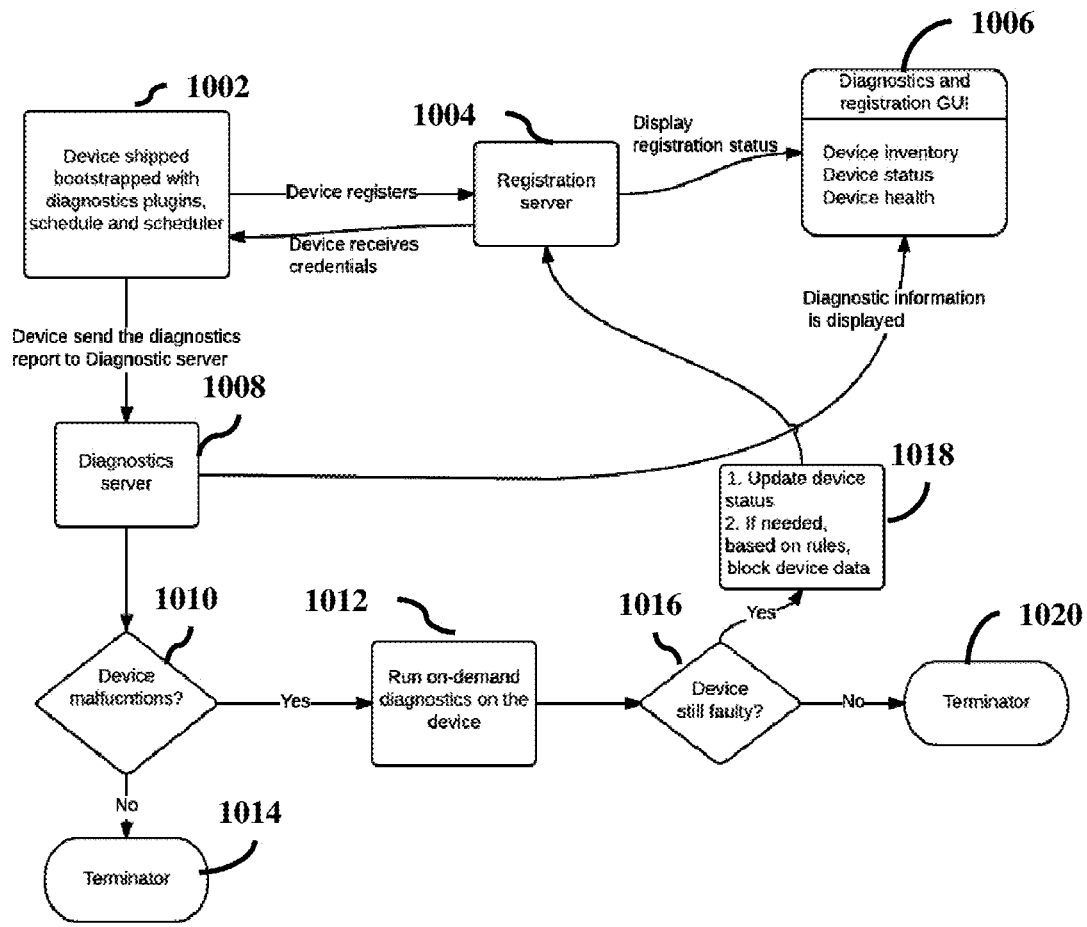
FIG. 10 is a process flow of Mission Control, according to the embodiments as disclosed herein.

FIG. 10 is a process flow of Mission Control, according to the embodiments as disclosed herein. The process flow begins at step 1002.

At step 1002, a device is shipped and bootstrapped with diagnostics plugins, schedule and scheduler.

At step 1004, the device registers with the registration server.

At step 1006, registration status is displayed through a diagnostics and registration Graphical User Interface (GUI). Typically, device inventory, device status and device health is displayed.

In response to the Mission Control at step 1004, the device receives credentials.

At step 1008, the device sends the diagnostics report to Diagnostics server. The diagnostic information is displayed through the diagnostics and registration GUI.

At step 1010, the device is checked for malfunctions. If there are malfunctions, then step 1012 is performed. Else step 1014 is performed.

At step 1012, run on-demand diagnostics is performed on the device.

At step 1016, if the device is still faulty then step 1018 is performed. Else step 1020 is performed. At step 1018, the device status is updated. If required, based on rules the device data is blocked. At step 1020, the process is terminated.

At step 1014 the process is terminated.

Operational Flow Diagram

Figure 11:
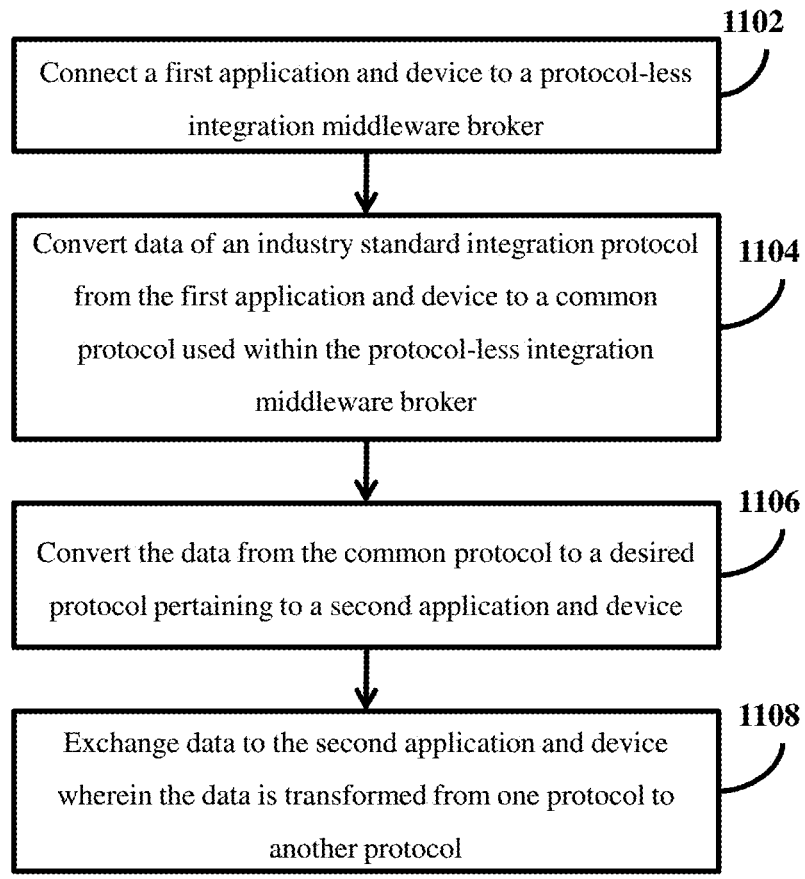
FIG. 11 is a flow diagram illustrating the method described herein, according to the embodiments as disclosed herein.

FIG. 11 is a flow diagram illustrating the method described herein, according to the embodiments as disclosed herein. The flow diagram begins at step 1102.

At step 1102, a first application and device is connected to a protocol-less integration middleware broker.

At step 1104, data of an industry standard integration protocol is converted from the first application and device to a common protocol used within the protocol-less integration middleware broker;

At step 1106, the data from the common protocol is converted to a desired protocol pertaining to a second application and device.

At step 1108, data is exchanged to the second application and device wherein the data is transformed from one protocol to another protocol.

The flow diagram ends at step 1108.

The method described herein is beneficial for several reasons as listed below:

1. Protocol agnostic integration.
2. Support for diversity of SaaS applications, enterprise systems and IoT devices.
3. Reduced cost of integration
4. Superior management features.

System Block Diagram

Figure 12:
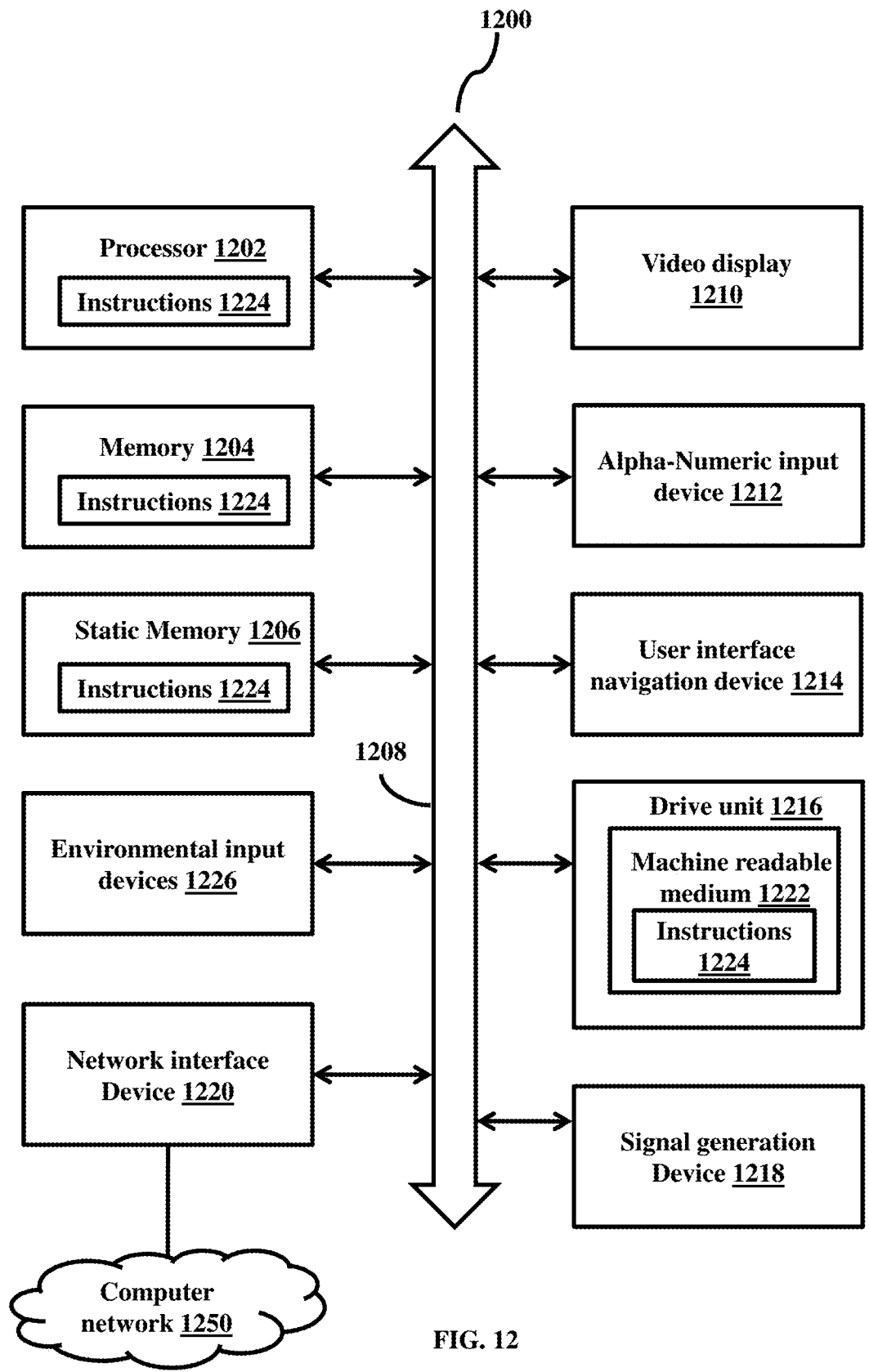
FIG. 12 is a block diagram of a machine in the example form of a computer system within which instructions for causing the machine to perform any one or more of the methodologies discussed herein may be executed.

FIG. 12 is a block diagram of a machine in the example form of a computer system within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU), or both), a main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker), and a network interface device 1220. The computer system 1200 may also include a environmental input device 1226 that may provide a number of inputs describing the environment in which the computer system 1200 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 1224 may further be transmitted or received over a computer network 1250 using a transmission medium. The instructions 1224 may be transmitted using the network interface device 1220 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans or Enterprise Java Beans. Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its substandards a, b, e, g, h, i, n, et al.). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention, which is set forth in the following claims.

The invention claimed is:

1. A computer-implemented method for providing protocol agnostic message oriented middleware for integration, the computer-implemented method comprising:
   connecting a first application and device to a protocol-less integration middleware broker, wherein the protocol-less integration middleware broker does not have a proprietary application programming interface (API) stored for integrating the first application and device with a second application and device;
   converting data of an industry standard integration protocol from the first application and device to a common protocol used within the protocol-less integration middleware broker;
   converting the data from the common protocol to a desired protocol pertaining to the second application and device; and
   exchanging data to the second application and device wherein the data is transformed from one protocol to another protocol.

2. The computer-implemented method of claim 1 and further comprising:
   supporting all industry standard integration protocols thereby providing hooks to the protocol-less integration middleware broker using any of the preferred integration protocol of connecting devices, applications and systems, wherein the protocol-less middleware broker is capable of establishing connection between any devices, sensors, enterprise software, relational databases, and SaaS applications.

3. The computer-implemented method of claim 1, wherein converting data from one protocol to another protocol achieves easy integration of diverse devices and systems to connect together with least effort and cost.

4. The computer-implemented method of claim 1 and further comprising:
   sending a message in a first protocol to a receiving application that receives the message in a second protocol;

converting the message to a common protocol;
processing the message within the protocol-less integration middleware broker using the common protocol; and
converting the information to a second desired protocol by a second application.

5. The computer-implemented method of claim 1 and further comprising:
allowing on-premise and site specific application to collaborate locally without the hop to the cloud on the centralized enterprise messaging broker.

6. The computer-implemented method of claim 5 further comprising a hybrid messaging cloud which uses a message routing pattern.

7. A computer program product stored on a non-transitory computer-readable medium that when executed by a processor, performs a method for providing protocol agnostic message oriented middleware for integration, the computer program product comprising:
connecting a first application and device to a protocol-less integration middleware broker, wherein the protocol-less integration middleware broker does not have a proprietary application programming interface (API) stored for integrating the first application and device with a second application and device;
converting data of an industry standard integration protocol from the first application and device to a common protocol used within the protocol-less integration middleware broker;
converting the data from the common protocol to a desired protocol pertaining to a second application and device; and
exchanging data to the second application and device wherein the data is transformed from one protocol to another protocol.

8. The computer program product of claim 7 and further comprising:
supporting all industry standard integration protocols thereby providing hooks to the protocol-less integration middleware broker using any of the preferred integration protocol of connecting devices, applications and systems, wherein the protocol-less integration middleware broker is capable of establishing connection between any devices, sensors, enterprise software, relational databases, and SaaS applications.

9. The computer program product of claim 7 wherein converting data from one protocol to another protocol achieves easy integration of diverse devices and systems to connect together with least effort and cost.

10. The computer program product of claim 7 and further comprising:
sending a message in a first protocol to a receiving application that receives the message in a second protocol;
converting the message to a common protocol;
processing the message within the protocol-less integration middleware broker using the common protocol; and
converting the information to a second desired protocol by a second application.

11. The computer program product of claim 7 and further comprising:
allowing on-premise and site specific application to collaborate locally without the hop to the cloud on the centralized enterprise messaging broker.

12. The computer program product of claim 11 further comprising a hybrid messaging cloud which uses a message routing pattern.

13. A system for providing protocol agnostic message oriented middleware for integration using a server, the server comprising a plurality of processors, the system comprising:
a suite of adapters and connectors that enable the ability to support all and any standard integration protocol thereby allowing any system to send and receive data using integration protocol of its own choice;
wherein the adapters comprise first processors of the plurality of processors coupled with a memory, the first processors configured for protocol conversion using the industry standard protocols, wherein a first adapter connects a first application to a protocol-less integration middleware broker and a second adapter connects a second application to the protocol-less integration middleware broker, and wherein the protocol-less integration middleware broker does not have a proprietary application programming interface (API) stored for integrating the first application with the second application;
wherein the connectors comprise second processors of the plurality of processors coupled with a memory, wherein the second processors are configured for application specific protocol conversion; and
a core message broker communicatively coupled with the suite of adapters and connectors responsible for routing, indirection and transformation.

14. The system of claim 13, wherein the suite of adapters and connectors includes the first application and the second application.

15. The system of claim 13, Wherein the adapters provide support to all standard protocols so that any system can send and receive data using the integration protocol of its own choice, and wherein the protocol-less integration middleware broker is capable of establishing connection between any devices, sensors, enterprise software, relational databases, and SaaS applications.

16. The system of claim 13 wherein the adapters convert any standard integration protocols to a common protocol used within the protocol-less integration middleware broker thereby a protocol-less or protocol agnostic middleware integration platform is established.

17. The system of claim 13 and further comprising:
a hybrid messaging cloud to federate and deliver messages to local brokers one of the centralized cloud and enterprise broker.

18. The system of claim 13 and further comprising:
an IoT Analytics real-time engine configured with the suite of adapters and connectors to deliver unstructured device data to the protocol-less integration middleware broker; and
a component engine configured in the protocol-less integration middleware broker to store and index the unstructured data in a timer sequence database.

* * * * *